Patented Nov. 2, 1926.

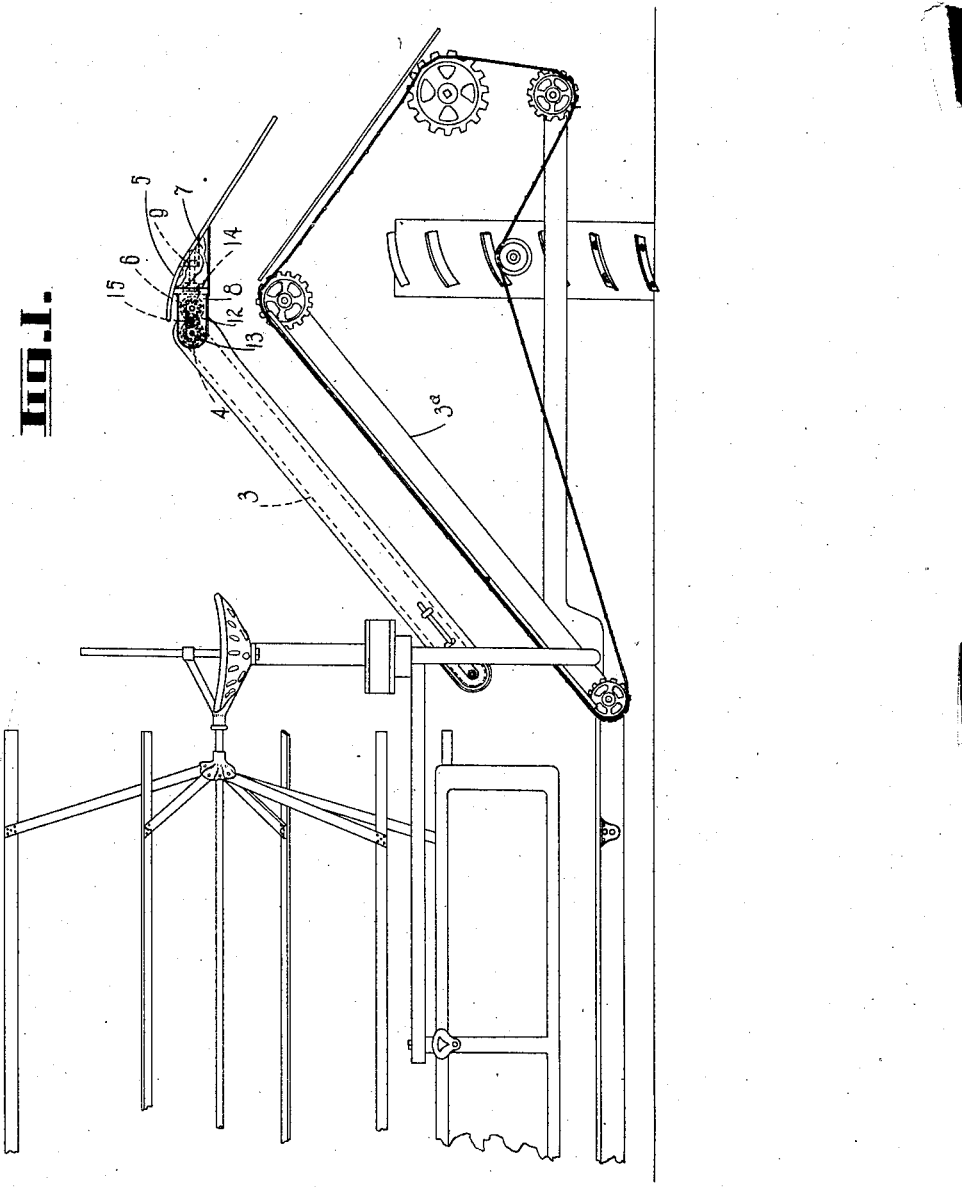

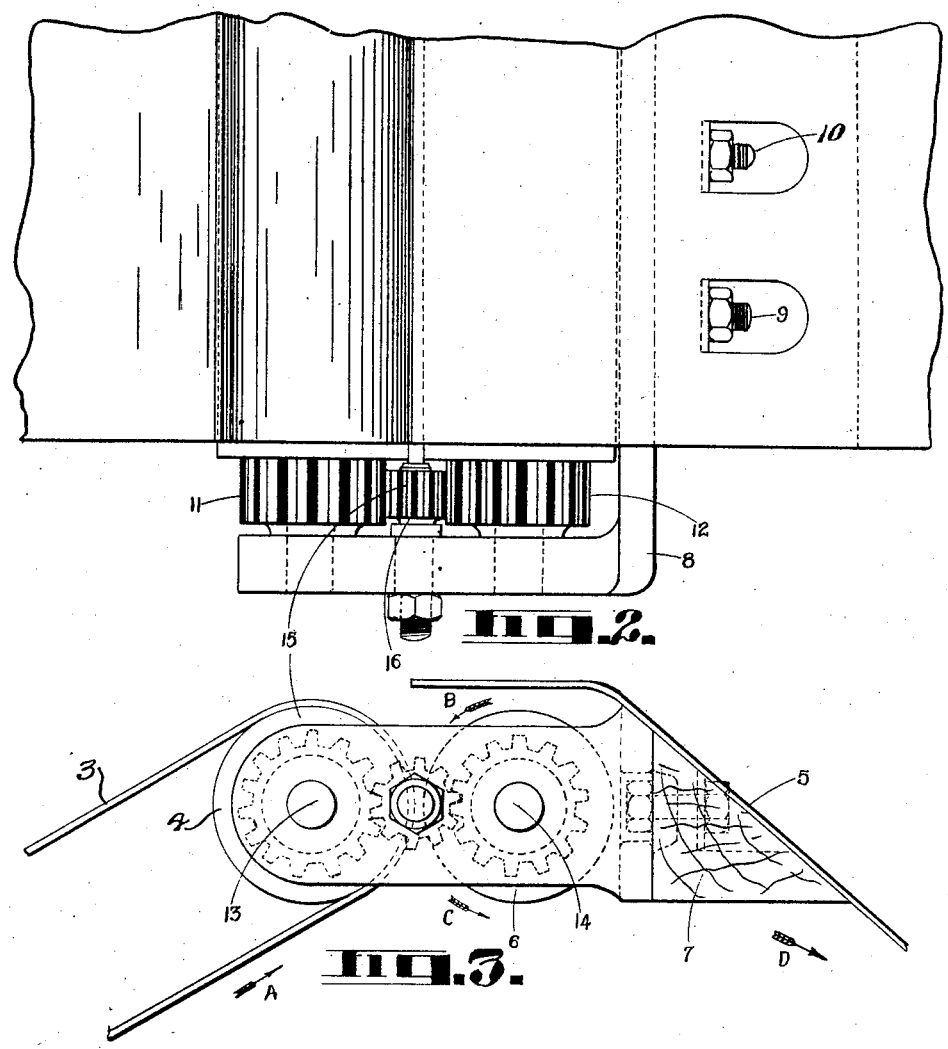

1,605,234

UNITED STATES PATENT OFFICE.

WILLIAM HUTCHINSON HOPPER, OF COLEVILLE, SASKATCHEWAN, CANADA.

GRAIN BINDER.

Application filed May 4, 1925. Serial No. 27,819.

The present invention appertains generally to improvements in the art of grain binders and relates specifically to an auxiliary attachment for preventing short grain and weeds accumulating at the upper end of the upper canvas conveyor between the same and grain deck cover.

Grain binders now commercially available are provided with inclined dual canvas conveyors between which, cut grain, intermingled weeds and obnoxious growth is conveyed to the grain deck of the binder where the grain is packed and bound into sheaves. Much trouble has been experienced with short grain and branchy weeds accumulating and packing at the upper end of the upper canvas conveyor between the same and the grain deck cover, which serves to stop the binding needle and associated mechanism, thus necessitating frequent removal thereof by the operator of the binder.

The object of my invention is to provide an auxiliary attachment which will remedy this inadequacy of design and adapt the binder for binder short grain, and grain infested with mustard, thistles and other obnoxious growth.

Another object of the invention resides in the provision of such an auxiliary attachment which may be mounted on the conventional binder without extensive alteration in the physical construction thereof.

With the foregoing and other objects in view which will appear more fully as the description proceeds, the invention resides in the novel combination and arrangement of co-operating elements as hereinafter more specifically set forth, claimed and shown in the accompanying drawings forming a part of the present application, and in which:

Fig. 1 is a fragmentary side elevation illustrating the application of my invention to a binder.

Fig. 2 is a fragmentary plan view illustrating the association of my invention with the upper canvas conveyor and the grain deck cover of a binder, and Fig. 3 is a fragmentary side elevation of the mechanism shown in Fig. 2.

The numeral 3 designates the upper canvas conveyor of the conventional binder which is trained about the roller 4, this roller being usually placed in closer proximity to the grain deck cover 5 than is here shown. To accommodate for the auxiliary roller 6 and the filler 7, the grain deck is spaced from the roller 4 as depicted.

The filler 7 may carry brackets at each end to suport the rollers 4 and 6, but for the purpose of illustration I have shown a bracket 8 at one end of said rollers only, which is secured to the filler 7 by the bolts 9 and 10 in the manner shown. Pinions 11 and 12 are secured to the shafts 13 and 14 of said rollers, said shafts being journalled in said bracket 8. A pinion 15 is positioned between the pinons 11 and 12 and is rotatedly mounted on the stub shaft 16, which is bolted to the bracket 8.

In operation, grain is conveyed upwardly between the lower canvas conveyor $3^a$, and the canvas conveyor 3 in the direction indicated by the arrow "A". The roller 6 rotating in the direction of the arrow "B" will direct the grain irrespective of its length together with weeds and obnoxous growth in the direction of the arrow "C", which grain will be prevented from twisting about the roller 6 by the filler 7 which serves to deflect the same downwardly in the direction indicated by the arrow "D" beneath the grain deck cover 5 to the grain deck and binding mechanism.

From the foregoing it will be obvious that I have provided very simple and adequate means for preventing accumulations of short grain and weeds at the upper of the canvas conveyor 3 between the same and the grain deck cover 5, which may be attached to the conventional binder without extensive alteration in the physical construction thereof.

While the preferred embodiment of the invention has been described it is to be understood that minor changes in the details of constructions, combination and arrangement of co-operating elements may be resorted to within the scope of what is claimed without departing from the spirit of the invention.

What I claim as new is:

1. The combination with a binder including an upper conveyor and grain deck cover, of means positioned at the upper end of said upper conveyor for preventing short grain and weeds accumulating between said upper end of said upper conveyor and said grain deck cover; including a roller, the surface of which adjoining said upper conveyor travels in a reverse direction with respect to said conveyor.

2. The combination with a binder including an upper conveyor and grain deck cover, of means positioned at the uper end of said upper conveyor for preventing short grain and weeds accumulating between said upper end of said upper conveyor and said grain deck cover; including a roller, the surface of which adjoining said upper conveyor travels in a reverse direction with respect to said conveyor; and a filler between said roller and grain deck cover for preventing grain and weeds twisting there about.

3. The combination with a binder including an upper conveyor and grain deck cover, of means positioned at the upper end of said upper conveyor for preventing short grain and weeds accumulating between said upper end of said upper conveyor and said grain deck cover; and including a roller geared to said conveyor, the surface of which adjoining said conveyor travels in a reverse direction with respect to said conveyor.

In testimony whereof, I affix my signature.

WILLIAM HUTCHINSON HOPPER.